United States Patent [19]

Vidalin et al.

[11] Patent Number: 4,524,427

[45] Date of Patent: Jun. 18, 1985

[54] METHOD FOR MAKING COMPARISONS BETWEEN REFERENCE LOGICAL ENTITIES AND LOGICAL ENTITIES PROCEEDING FROM A FILE

[75] Inventors: Jacques Vidalin, Montpellier; Jean L. Aucouturier, Gradignan, both of France

[73] Assignee: The University of Bordeaux 1, France

[21] Appl. No.: 404,979

[22] Filed: Aug. 4, 1982

[51] Int. Cl.³ .............................................. G06F 7/24
[52] U.S. Cl. .................................. 364/900; 340/146.2
[58] Field of Search ....................... 364/900; 340/146.2

[56] References Cited

U.S. PATENT DOCUMENTS

| | | | |
|---|---|---|---|
| 2,985,864 | 5/1961 | Fillebrown | 364/900 |
| 2,987,705 | 6/1961 | Van Mechelen | 364/900 |
| 4,366,551 | 12/1982 | Holtz | 364/900 |
| 4,425,617 | 1/1984 | Sherwood | 364/900 |
| 4,443,860 | 4/1984 | Vidalin | 340/146.2 |

Primary Examiner—David H. Malzahn
Attorney, Agent, or Firm—Ostrolenk, Faber, Gerb & Soffen

[57] ABSTRACT

The present invention relates to a method which uses results from comparisons, to permute data sources into read-out and/or into read-in for restarting or storage the information. Comparisons are made between data which does not necessarily issue from the same stream of information which is stored in buffer stores and compared on computing units for two data from different sources or on computing units for two data from the same source. The reference data are respectively stored in columns in reference tables. Simultaneously, the datum is recorded on one or more other columns of the tables to serve as references for the comparisons on a datum issuing from the same or different streams of information. The result of the comparisons permutes by a decoder the sources into read-out and/or into read-in, the columns of reference tables into read-out and into read-in and the corresponding computing units.

9 Claims, 2 Drawing Figures

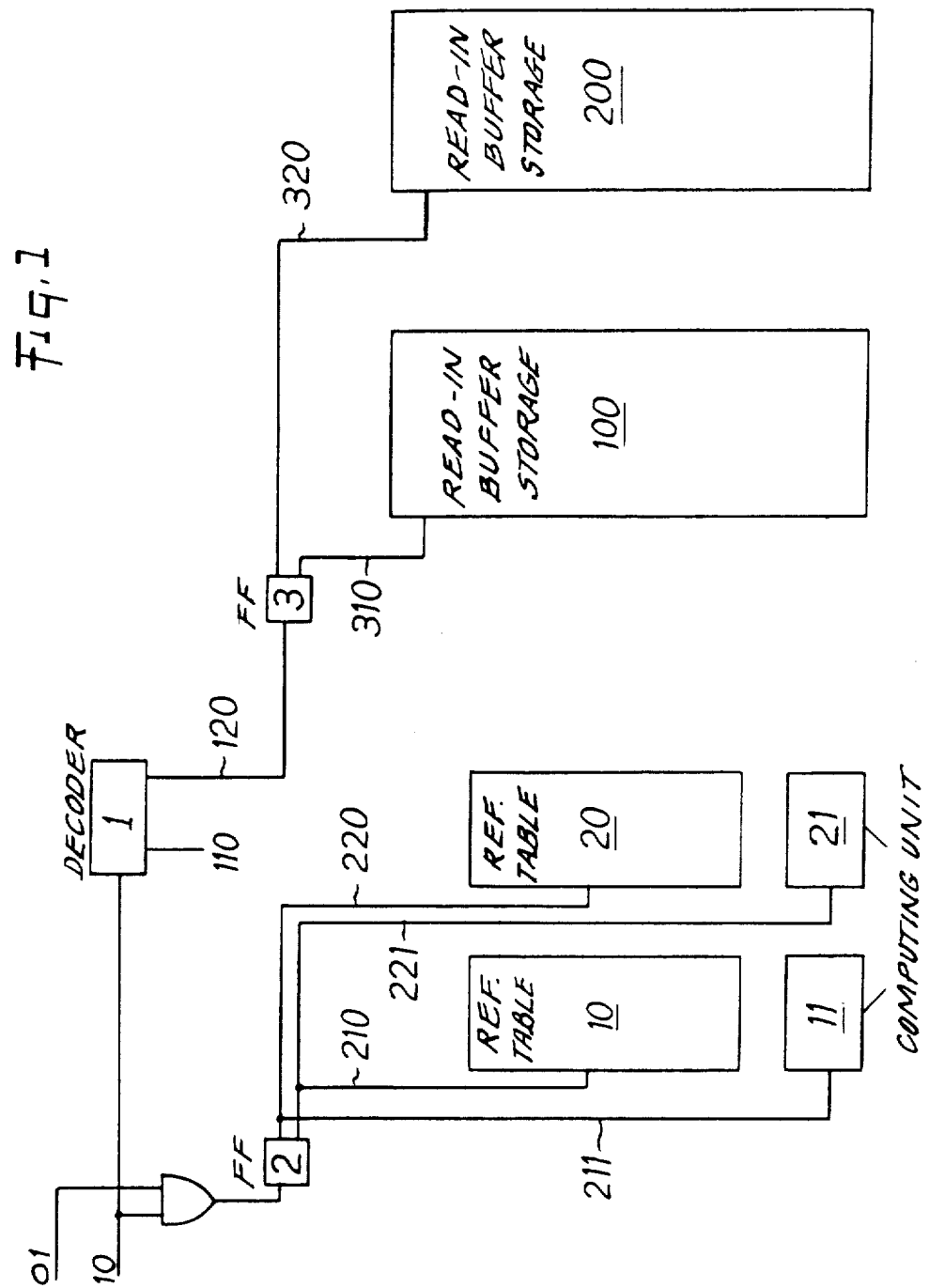

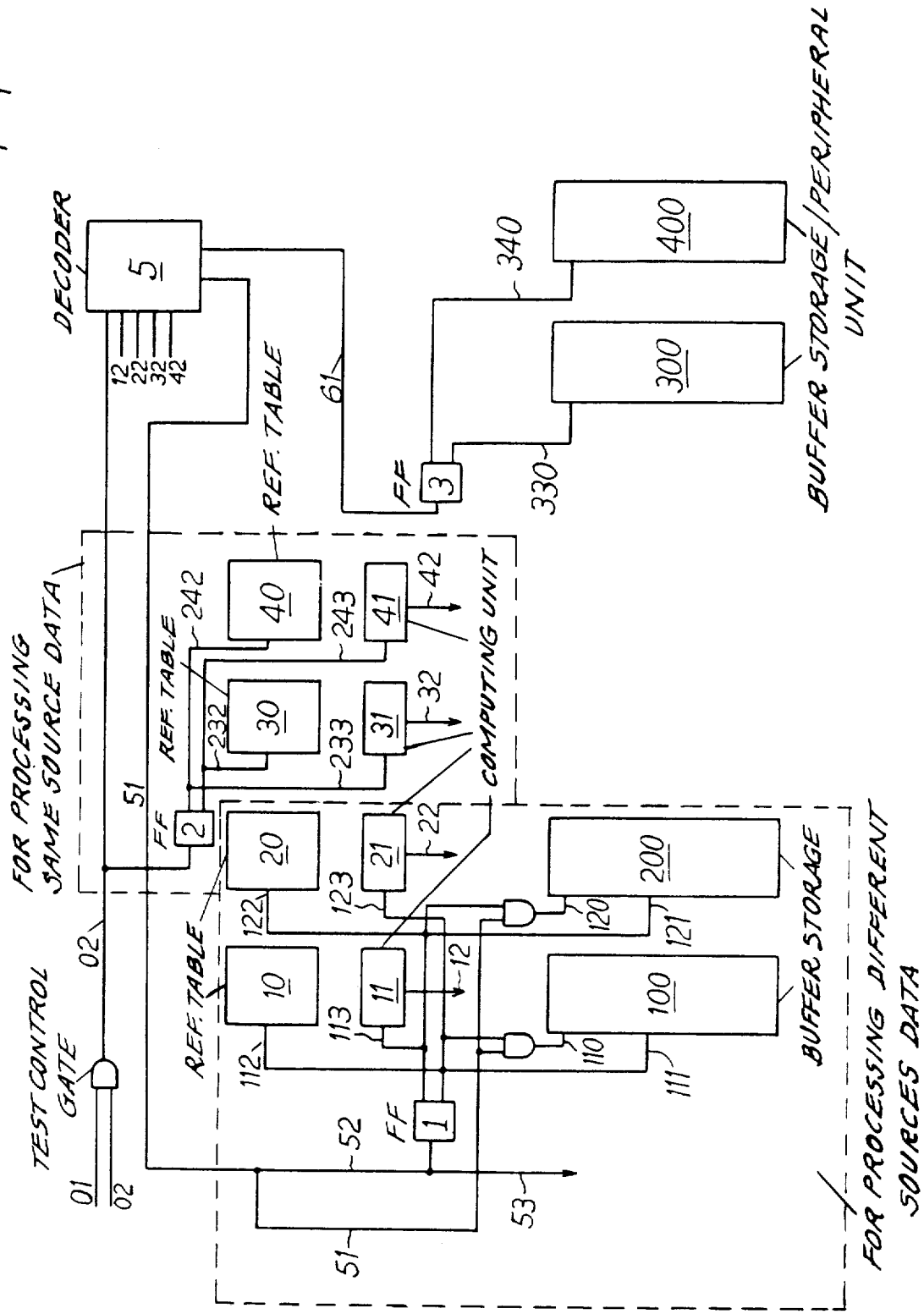

METHOD FOR MAKING COMPARISONS BETWEEN REFERENCE LOGICAL ENTITIES AND LOGICAL ENTITIES PROCEEDING FROM A FILE

BACKGROUND OF THE INVENTION

The present invention relates to a method for making comparisons between reference data elements and data elements proceeding or issuing from a file.

A process of iterative and simultaneous comparison between reference data elements and data elements proceeding from a file is described in U.S. Pat. No. 4,053,871.

A file upon which a comparison is to be carried out includes reference data elements consisting of items of information, for example, of octets. The data elements are of fixed or variable length. For variable length data elements, it is necessary to add to each data element a special character to indicate its end. The data elements, in turn, are gathered in sequences each of which is identified by a particular label (or ticket, or title, . . . ) called a special data element. The sequences may be fixed or variable length, that is to say, may include a number of data elements which may be fixed or not. A special character is added to each sequence which has a variable length to indicate its end.

An iterative and simultaneous comparison is performed which consists of testing for and recognizing a relationship between each data element, special or not, derived from a source and a number of reference data elements, simultaneously. The relationship is, for example, a relationship of equality, of inequality, of bracketing, etc.

For this purpose each data element from the source is matched, item of information by item of information, with the reference data elements which have been entered into successive lines of a reference table. The results from the matchings are combined in order to provide the result of the comparison which determines which information is to be stored.

U.S. Pat. No. 4,443,860 relates to a method of control which enables the method of comparison described above to be applied to items of information contained in a file having any construction or file arrangement whatever. The method is capable of operating at the frequency at which the items of information are received from the source, without an external preprocessing marking. The controlling and simultaneous execution of the elementary functions connected with the comparisons and the storage operations are carried out, without interrupting the retrieval of information from the file. The elementary functions which are to be executed simultaneously relate to: the localization (identification), processing and transfer of the items of information from the source; the sequential linking of the groups of simultaneous operations; and the tests concerning the results obtained from the preceding comparisons.

The method and contents of the above mentioned U.S. Pat. No. 4,443,860 are herein incorporated by reference. Its method essentially consists of the following steps:

(a) Reference data elements are recorded in a reference table with data elements of different types being stored vertically in different horizontal zones of the table. The reference data elements are stored in the same order that the sequences of data elements which they are to be compared appear, not necessarily in a consecutive fashion, in the source file. Each horizontal zone of the table contains reference data elements of the same type drawn up in their turn vertically by columns. For example, a given zone will contain the five words of the sentence "I want to go home", each word (reference data element) being located in a respective line of its column. All of the words in this zone are related and such that the reference data elements will be considered of the same type. These elements will be compared to input data elements also of the same type.

(b) In a control memory, the following is recorded line by line:

(1) First items of control information including, firstly, items of control information relating to the comparison to be carried out between input data elements of the same type from the source file and reference data elements located in a horizontal zone of the table corresponding with the line in the control memory in which the said items of comparison control information are recorded, and secondly items of control information relating to the storage of input data elements proceeding from the source file, and (2) second items of information for control of operations to be carried out at the end of the comparison or comparisons effected with one or more items of input data elements from the file and/or from the storage of one or more items of input data elements from the file, the said items of information for control of operations including items of jump control information for controlling the linkage of the processes to be carried out;

(c) items of information from the source file are consecutively received; and (d) the operations are executed which correspond with the first items of control information from a first line in the control memory, then the operations which correspond with the second items of control information from this line, among them especially the linkage onto another, not necessarily consecutive, line in the control memory and if necessary onto a horizontal zone of the reference table corresponding with this other line.

SUMMARY OF THE INVENTION

The object of the present invention is to apply a process of controlling comparisons of this type to the execution of processings for which it is necessary to control directly without intermediate operation, the permutation of sources of information into read-out and/or read-in data banks. The restart (iteration) and/or storage of corresponding items of information, or results obtained for each comparison are to be effected simultaneously for each item related to data issuing, or not, from the same stream of information. Each datum from a source file being able to be used both as datum to be compared and as reference datum.

The object of the present invention is thus to disclose an improved and more comprehensive method over the method disclosed in U.S. Pat. No. 4,443,860. In particular, the example of the operations of separation and collation characteristic of sort processing represent improvements over the previous method.

In fact, results from comparisons made between an item of information issuing from a stream of information and reference information located outside this stream make it possible to execute restart (iteration) and storage operations which are sufficient for a majority of identification processings required in automatic documentation.

In particular, such operations may be related to the recognition of a chain of characters located in any rank in a stream of information. The only limitations which may result from the application of the method of U.S. Pat. No. 4,443,860 are due primarily to the prior choice of the computing units for processing and/or control instructions. The present application will disclose examples of the data identification processings which employ a binary mask. A hardware embodiment and instructions (method) corresponding thereto will be described according to the present method.

Additional resources are required when comparisons are to be made between items of information issuing from a data source and other items of information which may optionally issue from the same source, so that each item of data must be considered as both pure data and reference data. Such is the case, for example, when separation and collation operations and sorting/processing is called for.

For executing a separation operation, at each item received, the datum selected as selection key must in fact be compared with the key corresponding to the item previously received and belonging to the same file. The result of such comparison controls read-in of the item received into the store corresponding, or not, to the one where the preceding item was previously stored. The result of the comparison consequently controls the permutation of the peripheral units into read-in.

For executing a collation operation, at each item received, the datum selected as selection key must be compared at the same time, on the one hand—for control of the non-rupture (segmentation) of the sequence of the file—with the selection key corresponding to the item previously received from the same file and, on the other hand, for the collation of operation proper—with the selection key corresponding to the item previously received from the other file from another peripheral unit in read-out. The combination of said results of comparison controls the permutation of the peripheral units into read-in and/or read-out.

Other characteristics of the invention will appear from the description given below by way of example with reference to the accompanying FIGS. 1 and 2 which show two examples of an application of the invention.

BRIEF DESCRIPTION OF THE DRAWINGS

FIG. 1 shows a block diagram for a circuit which controls the comparison operation of the present invention; and FIG. 2 shows a block diagram for a collation circuit according to a preferred embodiment.

DETAILED DESCRIPTION OF PREFERRED EMBODIMENTS

According to a first embodiment, a suitably placed, so-called separation control code makes it possible to control separation operation for items of information received from a source. The separation operation is performed prior to collation operations required for executing a sort routine designed to order the items of a file according to increasing or decreasing hierachial values of each datum belonging to a class of items each class being selected as a criterion key for the sort operation. The linkage process corresponding to the separation operations may be characterized in that:

(1) Initialization of the processing includes the loading of the maximum or minimum possible value of the selection key, which depends on the operation code chosen, into one of the columns of the reference data table.

(2) The datum to be compared, which is read from the source and which corresponds to the first item at the selection key, is loaded into another column of the reference data table. Simultaneously, at the same address or rank of each of the columns, the datum is compared, according to the method of U.S. Pat. No. 4,443,860, but with the initialization reference datum contained in the other column of the reference table. The item corresponding to the first selection key is stored temporarily on two buffer stores in read-in where it will be saved on a buffer store if a TRUE result for the comparison in question is obtained.

(3) The next datum to be compared which is received from the source and which corresponds to the selection key is again loaded at the same address at the first column of the reference table; and it is simultaneously compared to the reference data located at the same address for each of the other columns of the reference table. As previously mentioned, the reference data recorded on the other columns also corresponds to the selection key of the item contained previously in the file. The item corresponding to the second datum, received from the source, is conditionally stored in the two buffer stores in read-in where it will be saved in one and erased from the other of the buffer stores according to the result obtained for the comparison in question. In accordance with conventional algorithms for executing separation operations, the result of comparison permuts, at the end of the item, the buffer stores into read-in corresponding respectively to the conservation (saving) and to the erasure or deletion of the information received according to a TRUE or FALSE result which is obtained.

(4) The separation step continues until the end of the file is reached. The separation is accomplished by permuting for each selection key received, the column of the reference table where said key must be recorded and the column of the reference table containing the datum which is to be compared with the key received from the source. The computing unit for performing comparisons related to the column is also permuted.

As shown schematically in FIG. 1, the flip flop 2 is controlled, on the one hand, by link 10, and on the other, by the result test control activated by the link 01 of the linkage control. The flip flop 2 alternates the links 210 and 220, to control the read-in and the read-out of the columns of the reference tables 10 and 20 and by links 210 and 221 it controls the computing units 11 and 21 for comparisons corresponding to the subsequent comparisons to be effected. On the other hand, the result transmitted by the link 120 derived from the results decoder 1 actuated by the link 10 of the test control, controls the flip flop 3 which, in turn, respectively and alternatingly selects the buffer stores in read-in 100 and 200. The links 310 and 320 are the erasure controls for the stored information.

A more detailed explanation of the hardware for carrying out the general comparison control method can be found in U.S. Pat. No. 4,443,860, previously referred to.

According to a second embodiment of the present invention, a suitably placed, so-called collation control code makes it possible to control a collation operation on items of information issuing from two sources in read-out which are to be compared. The linkage process corresponding to the collation operation, is exemplified by and may be characterized in that:

(1) Initialization of the processing includes the loading of a maximum or minimum possible selection key value (which depends on the operation code selected) into one of the two columns of the reference data table corresponding to comparisons to be made between two data received from two different sources. At another column is stored the other maximum or minimum key value. The other column of the reference data table corresponds to and is reserved for comparisons to be made between two data received consecutively from the same source.

(2) From one of the buffer stores corresponding to one of the two peripheral units in read-out, the first datum to be compared corresponding to a respective selection key is loaded on one column of the reference data table corresponding to comparisons to be effected between two data received from two different sources, and simultaneously on another column of the reference data table corresponding to comparisons to be effected between two data received consecutively from the same source. Still simultaneously to the double recording of the datum on the columns, the datum is subjected to a double comparison made simultaneously according to the method of the U.S. Pat. No. 4,443,860. The comparisons are made, on the one hand, with the initialization value loaded previously, on one of the two columns of the reference data table corresponding and reserved for the comparisons to be effected between two data received from two different sources and, on the other hand, with the initialization value loaded previously in one of the two columns of the reference table corresponding and reserved for the comparisons to be effected between two data received consecutively from the same source. The item received from the source which serves as the selection key is stored conditionally in the buffer stores corresponding to each of the peripheral units in write-in, in which, it will be saved or erased according to the simultaneous results of the comparisons as described in U.S. Pat. No. 4,443,860.

(3) The subsequent item received from the same source and containing the subsequent datum to be compared as possibly matching the selection key is similarly stored conditionally in the buffer stores corresponding to each of the two peripheral units in read-in, in which according to the method, it will similarly be saved or erased depending on the results of the simultaneous comparisons made according to the selection key corresponding thereto.

In fact, simultaneously to the read-in operation of the item on the buffer stores of the two peripheral units in read-in, the datum corresponding to the selection key and belonging to the item is simultaneously recorded at the same table address, at a column of the reference table corresponding to the comparisons to be made between two data received from two different sources and, on the other hand, at another column of the reference table corresponding to the comparisons to be made between two consecutive data received from the same source. Still simultaneously to the double read-in operations, the datum corresponding to the selection key and belonging to the first item is compared simultaneously, still at the same address with the datum serving as reference and previously received from the other source and with the preceding datum serving as reference, and received consecutively from the same source as the datum subjected to comparison in accordance with the comparison method of U.S. Pat. No. 4,443,860.

(4) The collation operation continues up to detection of the items which comprise the end of the two files being processed. Such recognition controls and initiates read-out of the signal determining whether the exploitation of the files, from the two buffer stores corresponding to the peripheral units in read-out, gave rise to a tipping of the buffer stores corresponding to the peripheral units in read-in, and consequently whether or not it is necessary, by permuting the peripheral units from read-out to read-in and vice versa, from read-in to read-out, to continue execution of the collation processing.

For each item received, the combination of the results obtained for the corresponding comparisons controls and determines, at the end of an item, the permutation of the reference data tables into read-out and into read-in, as well as their corresponding computing units. It also controls permutation of the buffer stores into read-in and/or into read-out, as well as restart and/or storage of the corresponding items of information. These permutation operations are performed in accordance with well known conventional algorithms for executing collation operations.

These results concern:
the comparison made for said item between two data received from two different sources,
the comparison made, for said item, between two data received consecutively from the same source,
the comparison made, for the item previously received between two data received consecutively from the same source.

As shown schematically in FIG. 2:
the decoder 5 receives, by links 12 and 22, the results of the processing computing units 11 and 21 corresponding to the comparisons made between two data received from two different sources and, by links 32 and 42, the results of the processing computing units 31 and 41 corresponding to the comparisons made between two data received consecutively from the same source, the decoder 5 having stored the result corresponding to the last comparison made between two data received consecutively from the same source for the preceding item.

the test control gate, by output 02 which is activated by input 01 of the linkage control, activates, on the one hand, the decoder 5 and, on the other hand, the flip flop 2 alternating respectively by links 232 and 242, the read-in and read-out controls of the reference data tables 30 and 40 corresponding to the subsequent comparison to be made between two data received consecutively from the same source, as well as, by links 233 and 243, the controls of the computing units 31 and 41 of the corresponding tables.

link 51, according to the results received by decoder 5, controls:
through gate outputs 110 and 120, the initialisation at the restart value of the buffer store 100 or 200 previously in read-out,
flip flops 1 alternating respectively by outputs 111 and 121 the two buffer stores 100 and 200 corresponding to the two peripheral units in read-out, by outputs 112 and 122 the read-in and read-out of the columns of the reference tables 10 and 20 and by links 113 and 123 their corresponding comparison computing units 11 and 21, the sequencing of the buffer stores 100 and 200 being controlled independently of the sequencing of the reference tables 10 and 20 and their computing units 11 and 21.

link 53 effecting from the corresponding buffer store 100 or 200 in read-out and towards the reference table 10 or 20, towards the reference data table 30 or 40 for the following comparison to be effected and towards the buffer store 300 or 400 corresponding to the peripheral unit in read-in, read-in of the items of information to be stored on said reference stores or on said peripheral stores.

link 61, still according to the results received by the decoder 5 controls by the flip frop 3 and respectively by links 330 and 340 the sequencing and initialization at their restart value of the buffer stores 300 and 400 corresponding to the two peripheral units in read-in.

It will be noted that the elements and the controls of the devices of FIG. 1 and of FIG. 2 may easily be combined with one another.

The present invention is not limited solely to the embodiments described hereinabove, nor solely to the applications of the operations of separation and collation of sort processing. The method of the present Application allows numerous variants due to its general character and the various applications which it may allow. In particular, it may be developed in numerous ways in the field of documentation for applications which require updatings, mergers or simple parallel comparisons to be made on items of information belonging to one or more files issuing from the same source, or not, but subjected to the same process of comparison.

We claim:

1. A method for sequentially comparing data elements issuing from a stream of information to reference data stored in columns of a reference data table where a comparison computing unit is associated with each of said columns of said reference table, said comparing method providing comparison results in the form of TRUE or FALSE outputs adapted to allow said data elements to be separated and collated, said method comprising the steps of:
    (a) recording on a first column of said table an initial reference data and comparing at least a first of said data elements issuing from said stream of information to said reference data;
    (b) recording said data elements issuing from said stream of information on a second column of said reference table to provide further reference data, said data elements being recorded simultaneously with said comparing in step (a), said further reference data being recorded to serve as reference data for a subsequent comparison affecting subsequent data elements issuing from said stream of information;
    (c) applying said comparison results at the end of each comparison to said subsequent comparison to be executed, said comparison results controlling permutation of sources of data which generate said stream of information into read-out or read-in files, the permutation corresponding to a saving or deletion of data elements of said stream of information in dependence on said TRUE or FALSE outputs, said comparison results also controlling the restart or storage of items of information;
    (d) applying said comparison results at the end of each comparison to said subsequent comparison to be executed, said comparison results controlling the permutation of said columns of said reference table into read-out and into read-in categories, and controlling the permutation of said computing units for comparisons corresponding to said reference table columns.

2. The method of claim 1, wherein said stream of information originates from more than one data file.

3. A method for sequentially comparing data elements issuing from a stream of information to reference data stored in columns of a reference data table where a comparison computing unit is associated with each of said columns of said reference table, said comparing method providing comparison results in the form of a TRUE or FALSE output adapted to allow said data elements to undergo a process of separation, said method comprising the steps of:
    (a) recording an initial key value in a first column of said reference data table;
    (b) sequentially receiving data elements from said stream of information;
    (c) recording a received data element from said stream of information on a second column of said reference table and simultaneously comparing said received data element to reference data of said reference table including reference data recorded in said first column;
    (d) storing simultaneously in two distinct storage members said received item of information;
    (e) permuting, in dependence on said comparison results, sources of said items of information into read-in or read-out files corresponding to saving or deletion of said received item of information;
    (f) controlling, at the end of each comparison and in dependence on said comparison results the permutation of columns of said reference table into read-out or read-in files and permuting said computing units in accordance with the permutation of said columns;
    (g) reiterating said method for each subsequent item of information issuing from said sources until an end of file is detected.

4. The method of claim 3, wherein said stream of information originates from more than one data file.

5. The method of claim 3, wherein said initial key value comprises a maximum value for said initial key value.

6. The method of claim 3, wherein said initial key value comprises a minimum value for said initial key value.

7. A method for sequentially comparing data elements issuing from a stream of information to reference data stored in columns of a reference data table where a comparison computing unit is associated with each of said columns of said reference table, said comparing method providing comparison results in the form of a TRUE or FALSE output adapted to allow said data elements to be collated, said method comprising the steps of:
    (a) recording an initial key value in a first column of said reference table, said key value in said first column of said reference table providing further reference data for comparisons to be executed between data issuing consecutively from the same stream of information;
    (b) recording in a second column of said reference table another initial key value, said another initial key value providing further reference data for comparison to be executed between data issuing from two different streams of information;

(c) sequentially receiving data from one of said two different streams of information;

(d) recording said received data to be compared in a column of said reference table in which reference data reserved for comparison to be effected between two data issuing from two different streams of information and recording said received data also on another column of said reference table reserved for storing therein reference data for comparisons to be effected between data issuing from the same stream of information;

(e) comparing simultaneously to said recordings in step (d) said received data element with said initial value key stored in said first and second columns of said reference data table;

(f) storing simultaneously in two distinct storage members said received data element for possible saving of said data element;

(g) permuting, based on said comparison results of said comparison operation at the end of each comparison, sources of said stream of information into read-out or into read-in files in correspondence to a saving or deletion of said information;

(h) permuting based on said comparison results at the end of each comparison step said columns of said reference table in order to provide reference data for a subsequent comparison and also permuting said computing units in accordance with said permutation of said columns of said reference table;

(i) controlling through said permutation of said sources a restart of collation processing from said stream of information;

(j) reiterating said method for each item received from said one stream of information until an end of stream of information is detected; and (k) continuing said collation processing involving permutation of said storage members from read-out to read-in and from read-in to read-out until an overflow of a peripheral unit used in read-in is detected to have occurred during the last iteration of said collation processing.

8. The method of claim 7, wherein said initial key value and said another initial key value comprises respective maximum initial values.

9. The method of claim 7, wherein said initial key value and said another initial key value comprises respective minimum initial values.

* * * * *